United States Patent [19]
Miyano et al.

[11] Patent Number: 5,285,316
[45] Date of Patent: Feb. 8, 1994

[54] ZOOM LENS

[75] Inventors: Hitoshi Miyano; Nobuyuki Shirie, both of Omiya, Japan

[73] Assignee: Fuji Photo Optical Co., Ltd., Omiya, Japan

[21] Appl. No.: 788,463

[22] Filed: Nov. 6, 1991

[30] Foreign Application Priority Data

Nov. 8, 1990 [JP] Japan ................................. 2-301075

[51] Int. Cl.$^5$ .......................... G02B 15/14; G02B 9/08
[52] U.S. Cl. ..................................... 359/676; 359/684; 359/687; 359/738
[58] Field of Search ............................ 359/676–677, 359/680–687, 772, 774, 738–740

[56] References Cited

U.S. PATENT DOCUMENTS

| 4,256,381 | 3/1981 | Kreitzer | 359/740 |
|---|---|---|---|
| 4,299,453 | 11/1981 | Momiyama et al. | 359/740 |
| 4,802,747 | 2/1989 | Horiuchi | 359/687 |
| 4,844,599 | 7/1989 | Ito | 359/680 |
| 4,859,042 | 8/1989 | Tanaka | 359/687 |
| 5,134,524 | 7/1992 | Hamano et al. | 359/683 |
| 5,138,492 | 8/1992 | Hamano et al. | 359/684 |

Primary Examiner—Bruce A. Arnold
Assistant Examiner—Thong Nguyen
Attorney, Agent, or Firm—Oblon, Spivak, McClelland, Maier & Neustadt

[57] ABSTRACT

A zoom lens construction of the type including from the object side a first lens group having positive refractive power, a second lens group having negative refractive power, a third lens group having positive refractive power, and a fourth lens group having positive refractive power. The first and third lens groups being held stationary, the second lens group being movable along the optical axis for zooming operation, and the fourth lens group being movable to maintain a plane of focus in compensation for variations in subject distance and shifts of focal point resulting from zooming operations. The zoom lens comprising a stop provided between the second and third lens groups movably along the optical axis, and arranged to be located closer to the imaging plane at the longest focal length of a zooming range than at the shortest focal length thereof.

3 Claims, 5 Drawing Sheets

FIG. 3
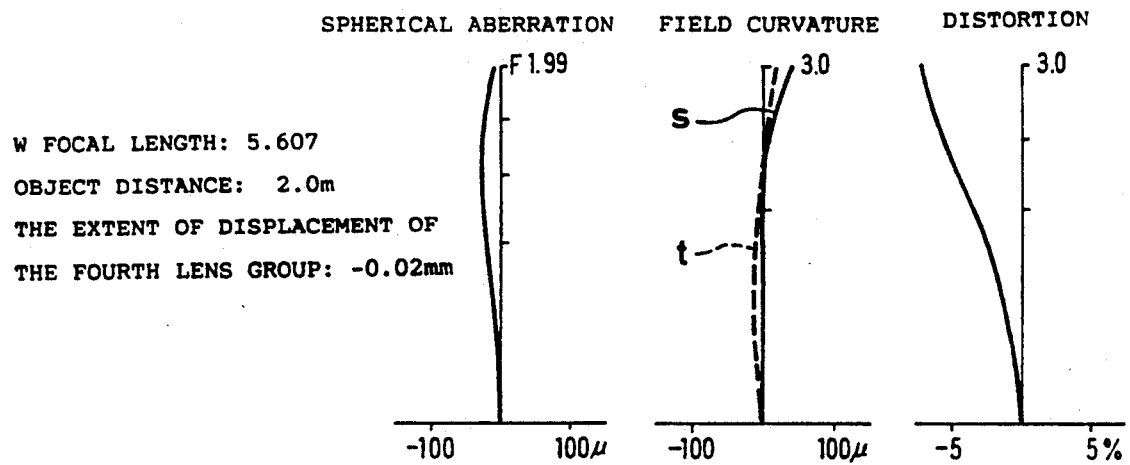
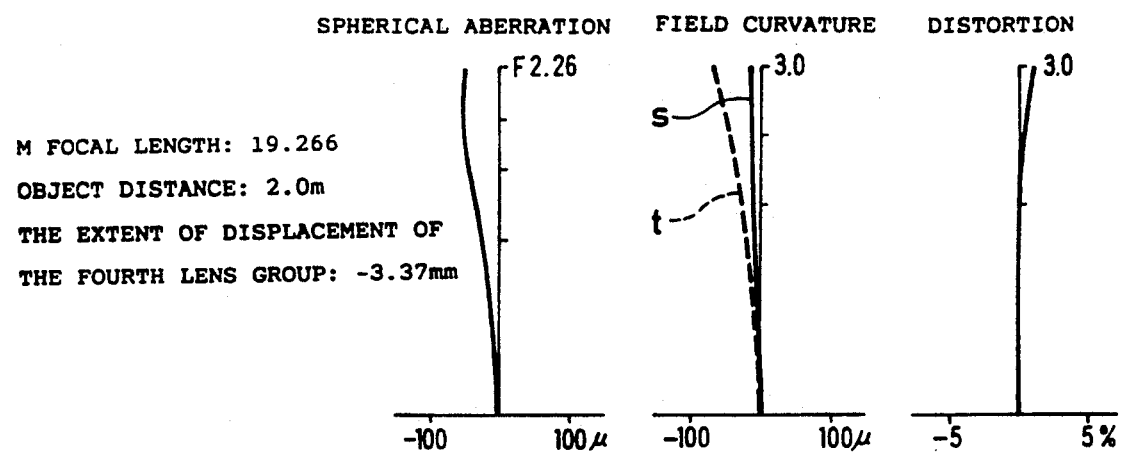
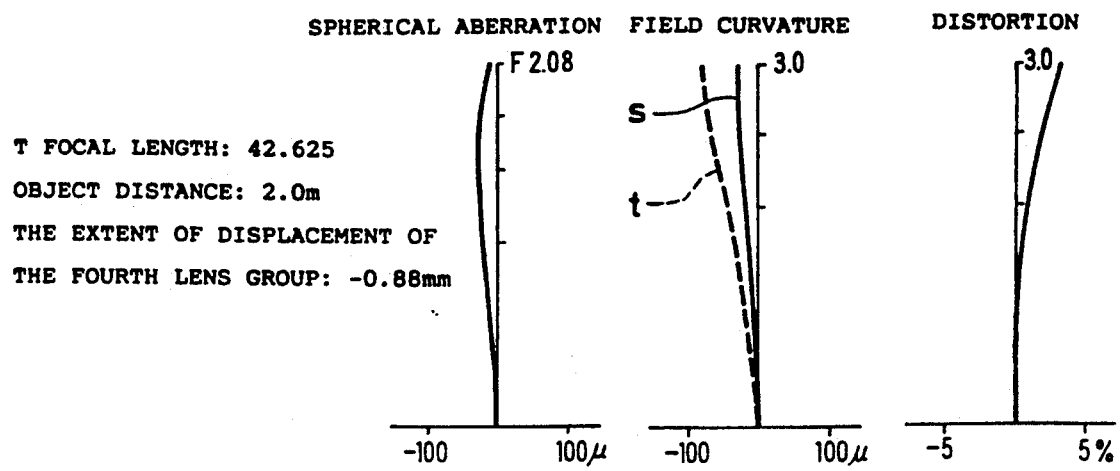

FIG. 5
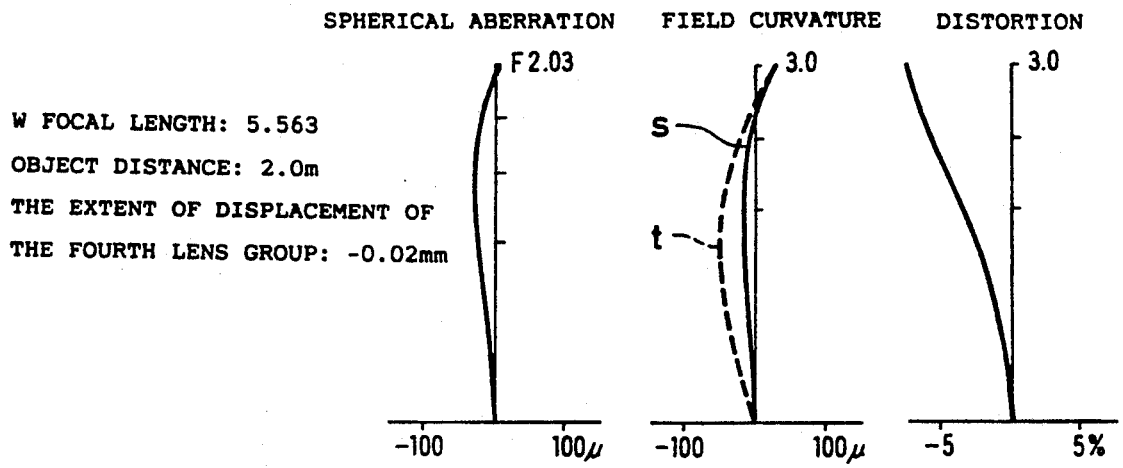
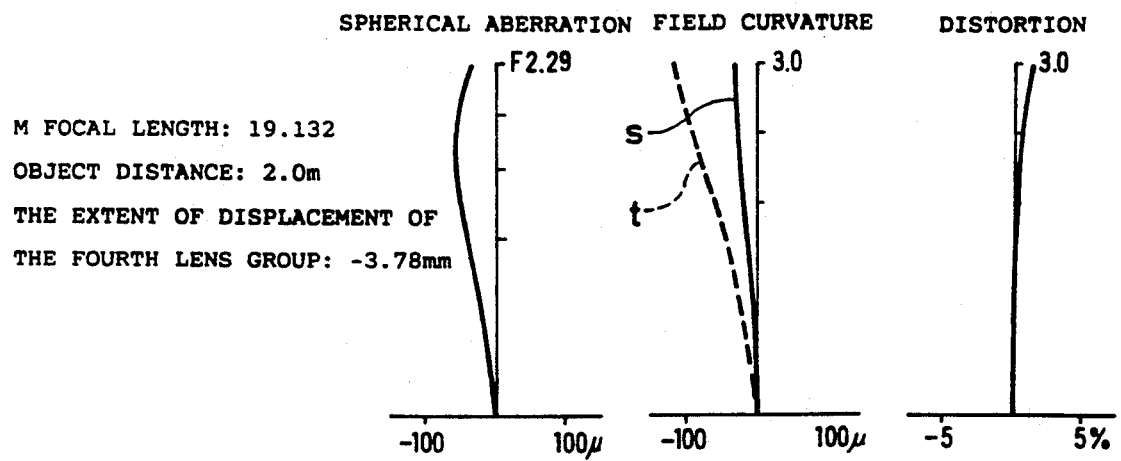
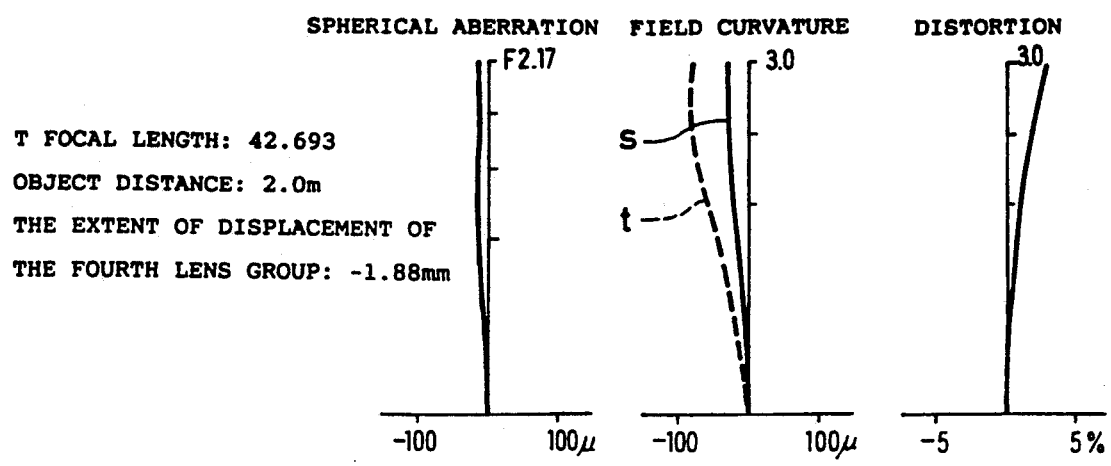

ZOOM LENS

BACKGROUND OF THE INVENTION

1. Field of the Art

This invention relates to a rear focus type zoom lens particularly suitable for use on a video camera with an autofocusing mechanism.

2. Description of the Prior Art

The main stream of conventional zoom lens construction has been to employ a second lens group for zooming operation, in combination with a third lens group or the so-called compensator which makes correction for shifts of focal point resulting from a zooming operation, and a first lens group which is movable along the optical axis for focusing purposes. However, the lens construction of this sort has a difficulty that an autofocusing mechanism is burdened with a great load when moving the first lens group for focusing purposes since the first lens group is usually large in diameter and heavy in weight. In this connection, as described in U.S. Pat. No. 4,256,381, for example, there has been proposed and known a lens construction employing, for focusing purposes, a fourth lens group which is small and light as compared with the first lens group. In this known lens construction, the first and third lens groups are held stationary, the second lens group is movable for zooming operation, and the focusing fourth lens group is also movable along the optical axis to maintain a plane of image despite the shift of focal point resulting from the zooming movement of the second lens group.

The lens construction which incorporates a fourth lens group in the above-described manner is advantageous in that the load on the autofocusing mechanism can be lessened. However, since the stop is fixed in the vicinity of the third lens group during a zooming operation, it is difficult to reduce the size of the bulky first lens group with the greatest outer diameter, barring efforts to reduce the size of the zoom lens as a whole for the sake of compactness.

SUMMARY OF THE INVENTION

The present invention contemplates to eliminate the above-mentioned drawbacks or problems of the prior art, and has as its object the provision of a zoom lens of the type which incorporates a fourth lens group for zooming action and which is so constructed as to permit to reduce the size of the first lens group into a compact form.

In accordance with the present invention, there is provided, for achieving the above-stated objective, a zoom lens construction including from the object side a first lens group having positive refractive power, a second lens group having negative refractive power, a third lens group having positive refractive power, and a fourth lens group having positive refractive power, the first and third lens groups being held stationary, the second lens group being movable along the optical axis for zooming operation, and the fourth lens group being movable to maintain a plane of image in compensation for variations in subject distance and shifts of focal point resulting from zooming operations, characterized in that the zoom lens comprises a stop provided between the second and third lens groups movably in the direction of the optical axis, and arranged to be located closer to the imaging plane at the longest focal length of a zooming range than at the shortest focal length thereof.

BRIEF DESCRIPTION OF THE DRAWINGS

The above and other objects, features and advantages of the invention will become apparent from the following description and the appended claims, taken in conjunction with the accompanying drawings which are given for illustrative purposes only and should not be construed as being limitative of the invention in any way whatsoever, and in which:

FIG. 3 shows aberration diagrams of the first embodiment;

FIG. 5 shows aberration diagrams of the second embodiment.

DESCRIPTION OF PREFERRED EMBODIMENTS

Hereafter, the invention is described more particularly with reference to the accompanying drawings.

According to the invention, the first and third lens groups of the zoom lens are held stationary, and the second lens group is movable along the optical axis for zooming operation. A stop is located between the second and third lens groups in such a manner that it is positioned closer to the imaging plane at the longest focal length than its position at the shortest focal length. This makes it possible to reduce the outer diameter of the first lens group by lowering the height of the chief light rays of the peripheral field angle at the first lens group, as compared with a lens construction employing a fixed stop.

Generally, in case of a zoom lens which is arranged to move a second lens group of negative refractive power along the optical axis for zooming operation, the height of chief rays of the peripheral field angle at a first lens group becomes higher (1) because of the angle of field which becomes wider at the shortest focal length than at the longest focal length and (2) because of the light rays which diverge across a broad spacing between the first and second lens groups. Taking into account the relationship between these two lens groups, in case a stop is fixed in the vicinity of a third lens group, the height of chief rays of the peripheral field angle at the first lens group normally becomes maximum when the position of the second lens group is slightly shifted toward the imaging plane. This phenomenon takes place more conspicuously when the stop is located further rearward of the second lens group. In order to hold as low as possible the height of the chief rays of the peripheral field angle at the first lens group, the stop should be located as close to the second lens group as possible. However, such a location of the stop would restrict the zooming range of the second lens group, resulting in a difficulty of obtaining a greater zoom ratio. Besides, it would invite increases in outer diameter of the third and fourth lens groups.

According to the present invention, a stop which is located between the second and third lens groups is moved concurrently with the zooming movement of the second lens group in such a way that the stop position at the longest focal length of zooming range is located closer to the imaging plane than the stop position at the shortest focal length. This arrangement permits a reduction of the outer diameter of the first lens group to provide a zoom lens of light-weight and compact form or to provide a zoom lens with a greater zoom ratio.

Figure 1:
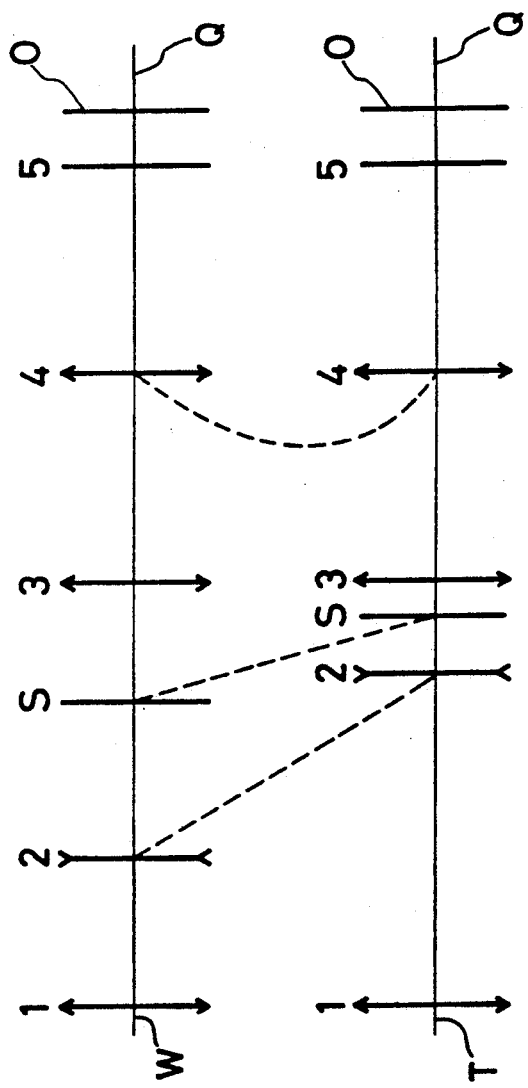
FIG. 1 is a diagrammatic illustration explanatory of a lens shift mode of the zoom lens between the shortest focal length and longest focal length according to the present invention.

In consideration of the foregoing observations, FIG. 1 shows a specific construction of the zoom lens according to the invention and an example of its lens shift mode. In FIG. 1, indicated at 1 is a first lens group having a positive overall focal length, at 2 is a second lens group having a negative overall focal length, at 3 is a third lens group having a positive overall focal length, at 4 is a fourth lens group having a positive overall focal length, at 5 is a filter such as a low-pass filter, at O is an imaging plane, at Q is an optical axis, at W is a state of the shortest focal length, and at T is a state of the longest focal length.

With regard to the lens shift mode of the zoom lens, the first and third lens groups 1 and 3 are held stationary during a zooming action, while the second lens group 2 is moved in a relatively large degree linearly or curvedly in operational characteristics from the object side to the imaging plane in a zooming operation from the shortest to the longest focal length position. For example, when the object is at infinity, the fourth lens group 4 is moved toward the object up to an intermediate point of a zooming operation from shorter to longer focal length position, and then moved toward the imaging plane.

The stop S is located between the second and third lens groups 2 and 3, and moved along with the zooming movement of the second lens group 2 such that the stop position at the longest focal length is closer to the imaging plane than the stop position at the shortest focal length. The position of the stop S may be shifted either linearly or stepwise by the use of an arbitrary displacement means, for example, the shifting means as described in Applicant's co-pending Japanese Patent Application 2-6928. The extent of displacement of the stop S is preferred to be in the range of ⅛ to ¼ of the displacement of the second lens group 2. With a smaller displacement range of the stop S, it becomes difficult to reduce the outer diameter of the first lens group 1. A stop displacement range in excess of the above-mentioned range is desirable for the reduction of outer diameter of the first lens group, but will give rise to another problem that the outer diameters of the third and fourth lens groups have to be increased. If not increased, there will occur a drop in peripheral light intensity at shorter focal lengths.

In accordance with the present invention, either the third lens group 3 or the fourth lens group 4 is preferred to have at least one aspheric surface. An aspheric surface in the third lens group 3 serves to suppress variations in aberrations as would result from the zooming movement of the second lens group 2. Namely, an aspheric surface in the third lens group 3 contributes to correction of spherical aberration and distortion of the whole zoom lens system in a favorable way. Provision of an aspheric surface in the fourth lens group 4 makes it possible to reduce the number of lens elements of the fourth lens group 4, and to correct various aberrations including field curvature to a satisfactory degree.

According to the present invention, the zoom lens system is preferred to satisfy the conditions of $$0.29 < |f_2|/\sqrt{f_W \cdot f_T} < 0.44 \quad (1)$$

where $f_2$ is the focal length of the second lens group, $f_W$ is the shortest focal length of the whole system, and $f_T$ is the longest focal length of the whole system.

The above condition (1) defines the refractive power of the second lens group 2. If smaller than the lower limit of the condition, the second lens group 2 will have a stronger negative power, which is desirable from the standpoint of compactness but will increase the negative Petzval sum to invite increased field curvature. On the other hand, if greater than the upper limit of the above condition, it becomes necessary to move the second lens group 2 over a greater distance to secure a given zoom ratio, and thus to increase the total length of the zoom lens at the sacrifice of compactness.

Further, according to the invention, the zoom lens is preferred to satisfy the condition of $$0.83 < f_3/f_W \cdot \sqrt{ZR} < 2.0 \quad (2)$$

where $f_3$ is the focal length of the third lens group and ZR is the zoom ratio ($f_T/f_W$).

The condition (2) defines the refractive power of the third lens group 3. If smaller than the lower limit, the correction of spherical aberration becomes insufficient. On the other hand, a value greater than the upper limit will result in overcorrection of spherical aberration. In any case, the correction of spherical aberration is difficult.

EMBODIMENTS

Hereafter, preferred embodiments of the invention are shown by way of specific values for:
m: Surface number counted from the object side;
$r_i$: Radius of curvature of a lens surface of number i counted from the object side;
$d_i$: On-axis thickness of a lens component or air spacing of number i counted from the object side;
$n_{ei}$: Index of refraction of a lens component of number i counted from the object side, with respect to line e.

The shape of an aspheric surface is expressed on the basis of X-axis in the direction of the optical axis and Y-axis indicative of the height on X-axis, as follows.

$$X = \frac{CY^2}{1 + \sqrt{1 - KC^2Y^2}} + A_1Y^2 + A_2Y^4 + A_3Y^6 + A_4Y^8$$

where C is a paraxial, K is an eccentricity, and $A_1$ to $A_4$ are aspheric coefficients.

The values of r, d and Y are shown in the unit of mm.

EMBODIMENT

Figure 2:
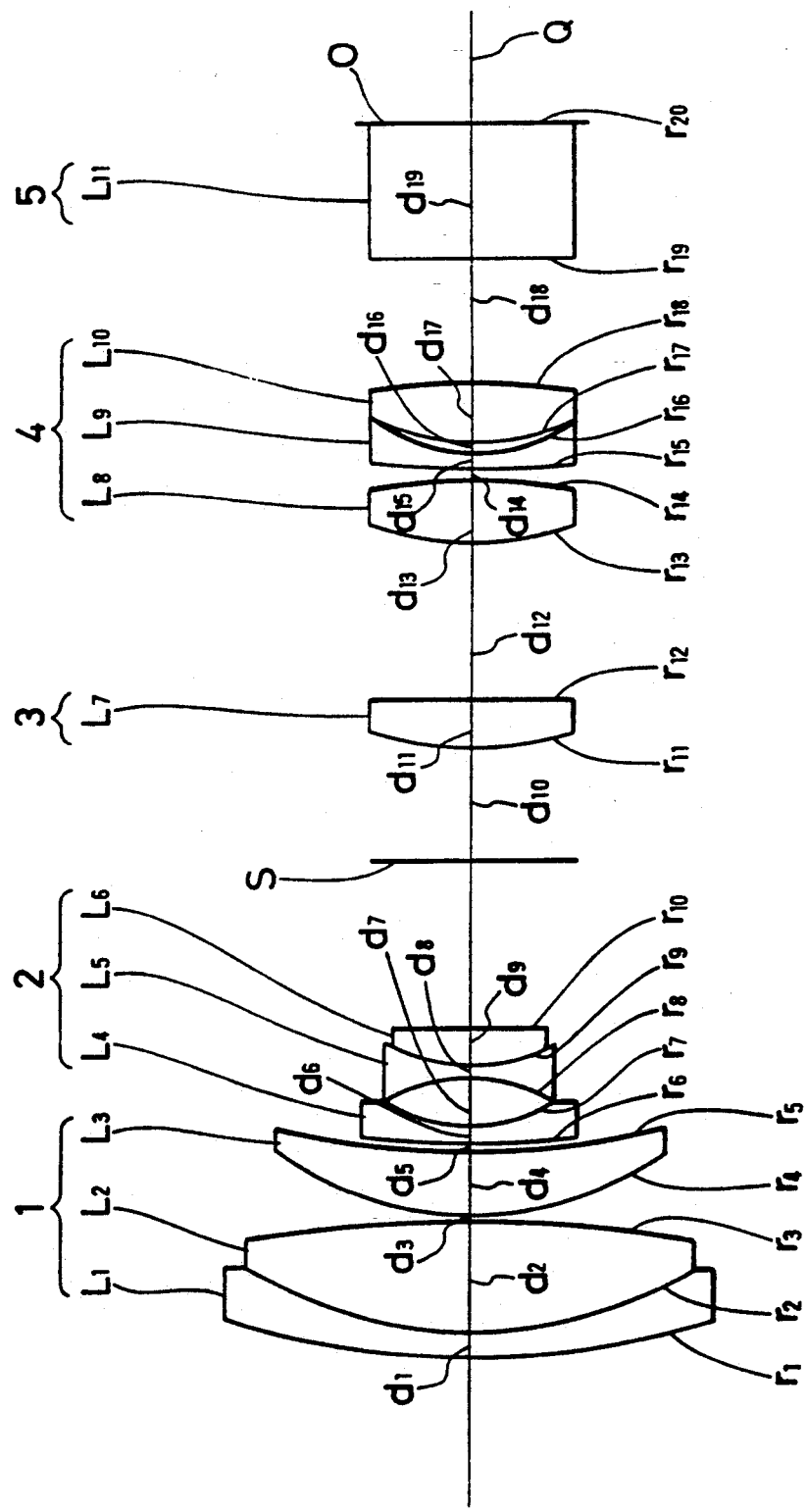
FIG. 2 is a diagrammatic illustration of a first embodiment of the invention, showing the respective lens groups of the zoom lens in positions of the shortest focal length.

FIG. 2 shows an example of the lens construction according to the present invention, in the position of the shortest focal length and infinite object distance.

The first lens group 1 is constituted by a cemented lens $L_1+L_2$ combining a negative meniscus lens element $L_1$ having a convex surface on the object side with a positive biconvex lens element $L_2$, and a positive meniscus lens $L_3$ having a convex surface on the object side. The second lens group 2 is constituted by a negative meniscus lens $L_4$ having a convex surface on the object side, and a cemented lens $L_4+L_6$ combining a negative biconcave lens element $L_5$ with a positive biconvex lens element $L_6$. The third lens group 3 is constituted by a positive biconvex lens $L_7$. Further, the fourth lens group 4 is constituted by a biconvex lens $L_8$, a negative meniscus lens $L_9$ having a convex surface on the object side, and a positive biconvex lens $L_{10}$. Denoted at $L_{11}$ is a filter like a low-pass filter. A stop S is located between the second and third lens groups 2 and 3. Surface #11 of $L_7$ of the third lens group 3 and surface #13 of $L_8$ of the fourth lens group 4 are aspheric surfaces.

The particulars of construction of this lens system are as follows.

| m | r | d | $n_e$ |
|---|---|---|---|
| 1 | 41.171 | 1.10 | 1.81264 |
| 2 | 20.542 | 5.41 | 1.59143 |
| 3 | −70.255 | 0.20 | |
| 4 | 15.311 | 3.21 | 1.59143 |
| 5 | 38.612 | Variable | |
| 6 | 71.425 | 0.72 | 1.83929 |
| 7 | 6.967 | 2.50 | |
| 8 | −8.213 | 0.72 | 1.77620 |
| 9 | 8.000 | 1.76 | 1.85504 |
| 10 | −92.558 | Variable | |
| 11 | Aspheric #1 | 2.50 | 1.59143 |
| 12 | −181.777 | Variable | |
| 13 | Aspheric #2 | 3.00 | 1.59143 |
| 14 | −23.283 | 0.50 | |
| 15 | 48.416 | 0.72 | 1.81264 |
| 16 | 8.424 | 0.48 | |
| 17 | 10.069 | 2.90 | 1.59143 |
| 18 | −37.886 | Variable | |
| 19 | ∞ | 6.40 | 1.51825 |
| 20 | ∞ | | |

| Aspheric Surfaces | |
|---|---|
| #1 | #2 |
| $C = 7.3274 \times 10^{-2}$ | $C = 8.3443 \times 10^{-2}$ |
| $K = 2.6880 \times 10^{-1}$ | $K = -1.7195$ |
| $A_1 = 0.0$ | $A_1 = 0.0$ |
| $A_2 = -4.3416 \times 10^{-5}$ | $A_2 = 6.3340 \times 10^{-6}$ |
| $A_3 = -1.6484 \times 10^{-6}$ | $A_3 = 2.8422 \times 10^{-8}$ |
| $A_4 = 7.2691 \times 10^{-9}$ | $A_4 = 3.0610 \times 10^{-12}$ |

Shown in the following table are the widths of the variable portions along with the focal length of the whole system. The numbers under "p" are various zoom positions with different focal lengths as indicated under "f".

| p | f | $d_5$ | $d_{10}$ | $d_{12}$ | $d_{18}$ |
|---|---|---|---|---|---|
| 1 (wide) | 5.607 | 0.5 | 13.5 | 7.50 | 0.0 |
| 2 | 8.236 | 3.5 | 10.5 | 6.34 | 1.16 |
| 3 | 13.238 | 6.5 | 7.5 | 5.03 | 2.47 |
| 4 | 19.227 | 8.5 | 5.5 | 4.32 | 3.18 |
| 5 | 28.635 | 10.5 | 3.5 | 4.54 | 2.96 |
| 6 (tele) | 42.748 | 12.5 | 1.5 | 7.50 | 0.0 |

($d_{12}$ and $d_{18}$ are values for infinite object distance)

$f_W = 5.607$    $f_T = 42.748$
$ZR = 7.624$    $f_2 = -5.003$
$f_3 = 21.566$ $|f_2|/\sqrt{f_W \cdot f_T} = 0.323$ $f_3/f_W \cdot \sqrt{ZR} = 1.393$ The following table shows the influence of the stop position on the outer diameter of the first lens group 1 of this system by way of the height of the chief light ray of the peripheral field angle (image height=3.0 mm) on surface #1 of the first lens group 1 at each of the aforementioned zoom positions (p).

| | $A_O$ | | $B_O$ | | $C_O$ | |
|---|---|---|---|---|---|---|
| p | * | Height | * | Height | * | Height |
| 1 | 0.5 | 10.80 | 5.3 | 10.17 | 6.5 | 9.97 |
| 2 | 0.5 | 11.13 | 4.1 | 10.51 | 6.5 | 9.93 |
| 3 | 0.5 | 10.05 | 2.9 | 9.54 | 3.5 | 9.38 |
| 4 | 0.5 | 9.05 | 2.1 | 8.61 | 3.5 | 8.14 |
| 5 | 0.5 | 8.19 | 1.3 | 7.88 | 0.5 | 8.19 |
| 6 | 0.5 | 7.58 | 0.5 | 7.58 | 0.5 | 7.58 |

(The asterisk * indicates a spacing between the stop and surface $r_{11}$ of the third lens group 3.)

In the foregoing table, the values under $A_o$ are of the prior art having a stop fixed at a position 0.5 mm spaced from surface #11 of the third lens group in the direction of the object, while the values under $B_o$ and $C_o$ are of the embodiments of the present invention having the stop position varied linearly ($B_o$) or stepwise ($C_o$) with the movement of the second lens group 2.

As clear from the foregoing table, the arrangements of $B_o$ and $C_o$ can provide a first lens group $L_1$ with a reduced outer diameter by 1.24 mm and 2.32 mm, respectively, as compared with the prior art arrangement $A_o$. The dimensional reduction of 1.24 mm to 2.32 mm means that the outer diameter of the first lens group 1 can be minimized by about 5% to 10%, and has a significant effects in providing video camera zoom lenses of compact form and light weight.

FIG. 3 shows aberration diagrams with regard to the particular embodiments given above. The aberration curves in these diagrams are of the positions 1, 4 and 6 of $B_o$ each at the object distance of 2 m. The same applies to the aberration diagrams which will appear in the following description.

EMBODIMENT

Figure 4:
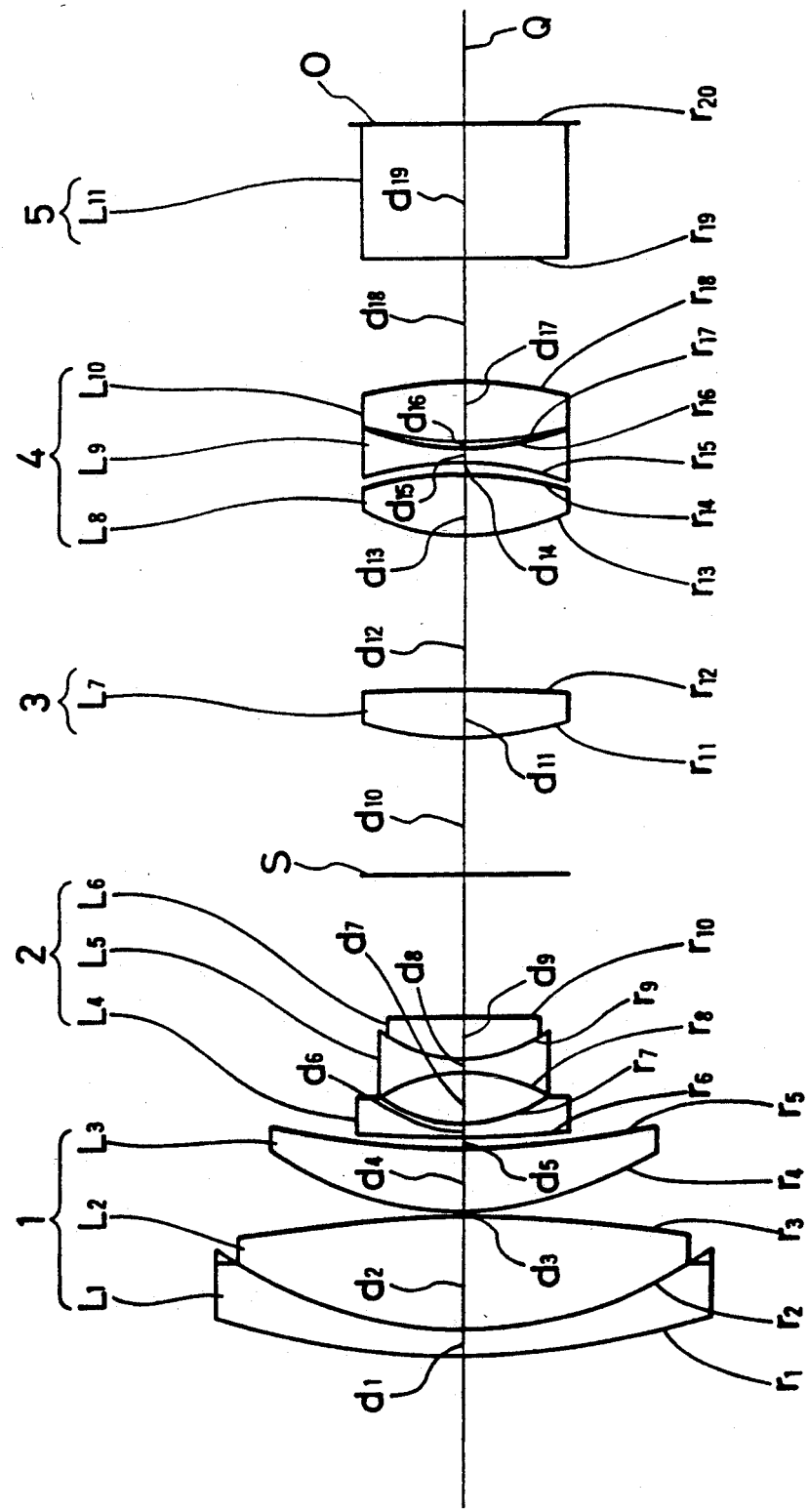
FIG. 4 is a diagrammatic illustration of a second embodiment of the invention, showing the respective lens groups of the zoom lens in positions of the shortest focal length.

FIG. 4 shows a second embodiment of the zoom lens construction according to the present invention. In this second embodiment, the first lens group 1 is constituted by a cemented lens $L_1+L_2$ combining a negative meniscus lens element $L_1$ having a convex surface on the object side with a positive biconvex lens element $L_2$, and a positive meniscus lens $L_3$ having a convex surface on the object side. The second lens group 2 is constituted by a negative meniscus lens $L_4$ having a convex surface on the object side, and a cemented lens $L_5+L_6$ combining a negative biconcave lens element $L_5$ with a positive biconvex lens element $L_6$. The third lens group 3 is constituted by a positive biconvex lens $L_7$. Further, the fourth lens group 4 is constituted by a positive biconvex lens $L_8$, a negative biconcave lens $L_9$, and a positive biconvex lens $L_{10}$. Denoted at $L_{11}$ is a filter like a low-pass filter in the form of a plate with flat parallel surfaces. A stop S is located between the second and third lens groups 2 and 3. Surface #11 of $L_7$ of the third lens group 3 and surface #17 of $L_{10}$ of the fourth lens group 4 are aspheric surfaces.

The particulars of construction of this lens system are as follows.

| m | r | d | $n_e$ |
|---|---|---|---|

-continued

| | | | |
|---|---|---|---|
| 1 | 41.867 | 1.10 | 1.81264 |
| 2 | 20.302 | 5.42 | 1.59143 |
| 3 | −73.868 | 0.20 | |
| 4 | 15.688 | 3.24 | 1.59143 |
| 5 | 43.289 | Variable | |
| 6 | 50.028 | 0.72 | 1.83929 |
| 7 | 7.107 | 2.51 | |
| 8 | −7.952 | 0.72 | 1.77620 |
| 9 | 5.840 | 2.24 | 1.81264 |
| 10 | −149.759 | Variable | |
| 11 | Aspheric #1 | 2.50 | 1.59143 |
| 12 | −84.969 | Variable | |
| 13 | 10.786 | 3.00 | 1.67341 |
| 14 | −17.149 | 0.50 | |
| 15 | −16.579 | 0.72 | 1.81264 |
| 16 | 12.562 | 0.48 | |
| 17 | Aspheric #2 | 2.90 | 1.59143 |
| 18 | −17.889 | Variable | |
| 19 | ∞ | 6.40 | 1.51825 |
| 20 | ∞ | | |

Aspheric Surfaces

| #1 | #2 |
|---|---|
| $C = 7.1550 \times 10^{-2}$ | $C = 7.5032 \times 10^{-2}$ |
| $K = 9.9706 \times 10^{-1}$ | $K = 1.2764$ |
| $A_1 = 0.0$ | $A_1 = 0.0$ |
| $A_2 = -7.3863 \times 10^{-5}$ | $A_2 = -3.5839 \times 10^{-4}$ |
| $A_3 = -1.5729 \times 10^{-6}$ | $A_3 = -1.5152 \times 10^{-6}$ |
| $A_4 = 7.2735 \times 10^{-9}$ | $A_4 = -2.0539 \times 10^{-8}$ |

Shown in the following table are the widths of the variable portions along with the focal length of the whole system. The numbers under "p" are various zoom positions with different focal lengths as indicated under "f".

| p | f | $d_5$ | $d_{10}$ | $d_{12}$ | $d_{18}$ |
|---|---|---|---|---|---|
| 1 (wide) | 5.563 | 0.5 | 13.5 | 7.50 | 0.0 |
| 2 | 8.153 | 3.5 | 10.5 | 6.25 | 1.25 |
| 3 | 13.102 | 6.5 | 7.5 | 4.80 | 2.70 |
| 4 | 19.100 | 6.5 | 7.5 | 4.80 | 2.70 |
| 5 | 28.694 | 10.5 | 3.5 | 3.86 | 3.64 |
| 6 (tele) | 42.751 | 12.5 | 1.5 | 6.51 | 0.99 |

($d_{12}$ and $d_{18}$ are values for infinite object distance)

$f_W = 5.563$    $f_T = 42.751$
$ZR = 7.685$    $f_2 = -4.877$
$f_3 = 20.486$ $|f_2|/\sqrt{f_W \cdot f_T} = 0.316$ $f_3/f_W \cdot \sqrt{ZR} = 1.328$ The following table shows the influence of the stop position on the outer diameter of the first lens group 1 of this system by way of the height of the chief light ray of the peripheral field angle (image height=3.0 mm) on surface #1 of the first lens group 1 at each of the aforementioned zoom positions (p).

| p | $A_O$ * | Height | $B_O'$ * | Height |
|---|---|---|---|---|
| 1 | 0.5 | 11.13 | 6.5 | 10.31 |
| 2 | 0.5 | 11.32 | 6.5 | 10.19 |
| 3 | 0.5 | 10.14 | 4.5 | 9.54 |
| 4 | 0.5 | 9.06 | 2.5 | 8.54 |
| 5 | 0.5 | 8.11 | 1.5 | 7.74 |
| 6 | 0.5 | 7.54 | 0.5 | 7.54 |

(The asterisk * indicates a spacing between the stop and surface $r_{11}$ of the third lens group 3.)

Similarly to the first embodiment, the values under $A_O$ of the foregoing table are of the prior art having a stop fixed at a position 0.5 mm spaced from surface #11 of the third lens group in the direction of the object, while the values under $B_O'$ are of the embodiment of the present invention having the stop position held stationary over a certain range of zooming from the shortest focal length position and then gradually moved toward the third lens group 3. As clear from the table, the arrangement $B_O'$ permits to reduce the outer diameter of the first lens group $L_1$ by 2.02 mm as compared with the prior art arrangement $A_O$.

Aberration diagrams of this embodiment are shown in FIG. 5.

Each of the aspheric lenses in the foregoing embodiments may be a glass lens or a plastic lens. Needless to say, according to the present invention, the reduction of the outer diameter becomes feasible not only for the first lens $L_1$ of the first lens group 1 but also for $L_2$ of the second lens group 2 and $L_3$ of the third lens group 3.

What is claimed is:

1. A zoom lens including from the object side a first lens group having positive refractive power, a second lens group having negative refractive power, a third lens group having positive refractive power, and a fourth lens group having positive refractive power, said first and third lens group being held stationary, said second lens group being movable along an optical axis for zooming operation, and said fourth lens group being movable to maintain a plane of focus in compensation for variations in subject distance and shifts of focal point by zooming operations, wherein said zoom lens comprises:

a stop provided between said second and third lens groups movably along the optical axis and arranged to be located closer to an imaging plane at the longest focal length of a zooming range than at the shortest focal length thereof;

wherein said stop is movable in the range of ½ to ¼ of axial displacement of said second lens group.

2. A zoom lens as defined in claim 1, wherein, in an operation zooming from a shorter focal length to a longer focal length for an object at infinite, said second lens group and stop are moved toward the imaging plane from respective positions on the object side, and said fourth lens group is moved toward said object up to an intermediate point of said zooming operation and then moved in the reverse direction.

3. A zoom lens as defined in claim 1, wherein said stop is arranged to be moved linearly or non-linearly in operational characteristics.

* * * * *